TELEVISION SCAN RATE CONVERSION USING MAGNETIC RECORD

Original Filed June 8, 1960

4 Sheets-Sheet 1

INVENTORS
Denis Edward Urry
John Lewis Edwin Baldwin
BY John J. Pederson
Atty.

Nov. 1, 1966 D. E. URRY ET AL 3,283,068

TELEVISION SCAN RATE CONVERSION USING MAGNETIC RECORD

Original Filed June 8, 1960 4 Sheets-Sheet 2

INVENTORS
Denis Edward Urry
John Lewis Edwin Baldwin
BY
John J. Pederson
Atty.

INVENTORS
Denis Edward Urry
John Lewis Edwin Baldwin
BY John J. Pederson
Atty.

INVENTORS
Denis Edward Urry
John Lewis Edwin Baldwin
BY
John J. Pederson
Atty.

3,283,068
Patented Nov. 1, 1966

3,283,068

TELEVISION SCAN RATE CONVERSION USING MAGNETIC RECORD

Denis Edward Urry, Kent, and John Lewis Edwin Baldwin, Surrey, England, assignors to Bush and Rank Cintel Limited, a British company Continuation of abandoned application Ser. No. 34,793, June 8, 1960. This application July 9, 1963, Ser. No. 293,781
Claims priority, application Great Britain, June 18, 1959, 20,964/59
7 Claims. (Cl. 178—6.6)

This invention relates to apparatus for converting television signals from one scanning standard to another, or more specifically, apparatus utilizing recording techniques to vary the line-scanning and frame-frequency rates characteristic of one television signal train to line-scanning and frame-frequency rates characteristic of a second television signal train.

The present application is a continuing application based upon our co-pending application Serial No. 34,793, filed June 8, 1960, and now abandoned.

In the international exchange of television programs the difficulty frequently arises that the scanning standard employed in the country of origin differs from that employed in the country to which the program is transmitted, so that it is necessary for the original signals to be modified before they can be broadcast in the country receiving the program. Previously, standards conversion has been performed by displaying to a television camera, operating on the scanning standard of the country receiving the program, a picture reconstituted by a monitor operating on the scanning standard of the originating country. While acceptable pictures are sometimes obtained by this process, this is by no means always the case, and many instances of internationally exchanged programs being of very low entertainment value have occurred.

It is an object of this invention to provide a new and improved method of converting a first television signal of specified line and frame-scanning frequencies to a second television signal having different line and frame-scanning frequencies.

It is also an object of this invention to provide a method for eliding or repeating lines and frames in a train of television signals.

It is a further object of this invention to provide a recording method for omitting information from a television signal train or synthesizing additional information to be included in it.

In accordance with this invention a new and improved apparatus for the conversion of a television signal having a given number of lines per frame comprises means for producing a physical record of the television signal to be converted, means for traversing the record with an effectively infinite succession of scanning elements effectively spaced apart by the length of a single recorded scanning line and means for deriving an output signal from each of the scanning lines in succession, the relative speeds of the record and the elements and the transitions from one to another of the elements being effected at such intervals that the number of lines per frame in the derived television signal differs from that in the recorded signal.

The features of this invention which are believed to be novel are set forth with particularity in the appended claims. The invention, together with further objects and advantages thereof, may best be understood, however, by reference to the following description, taken in conjunction with the accompanying drawings, in the several figures of which like reference numerals identify like elements, and in which:

Figures 1, 2, 3, 4:
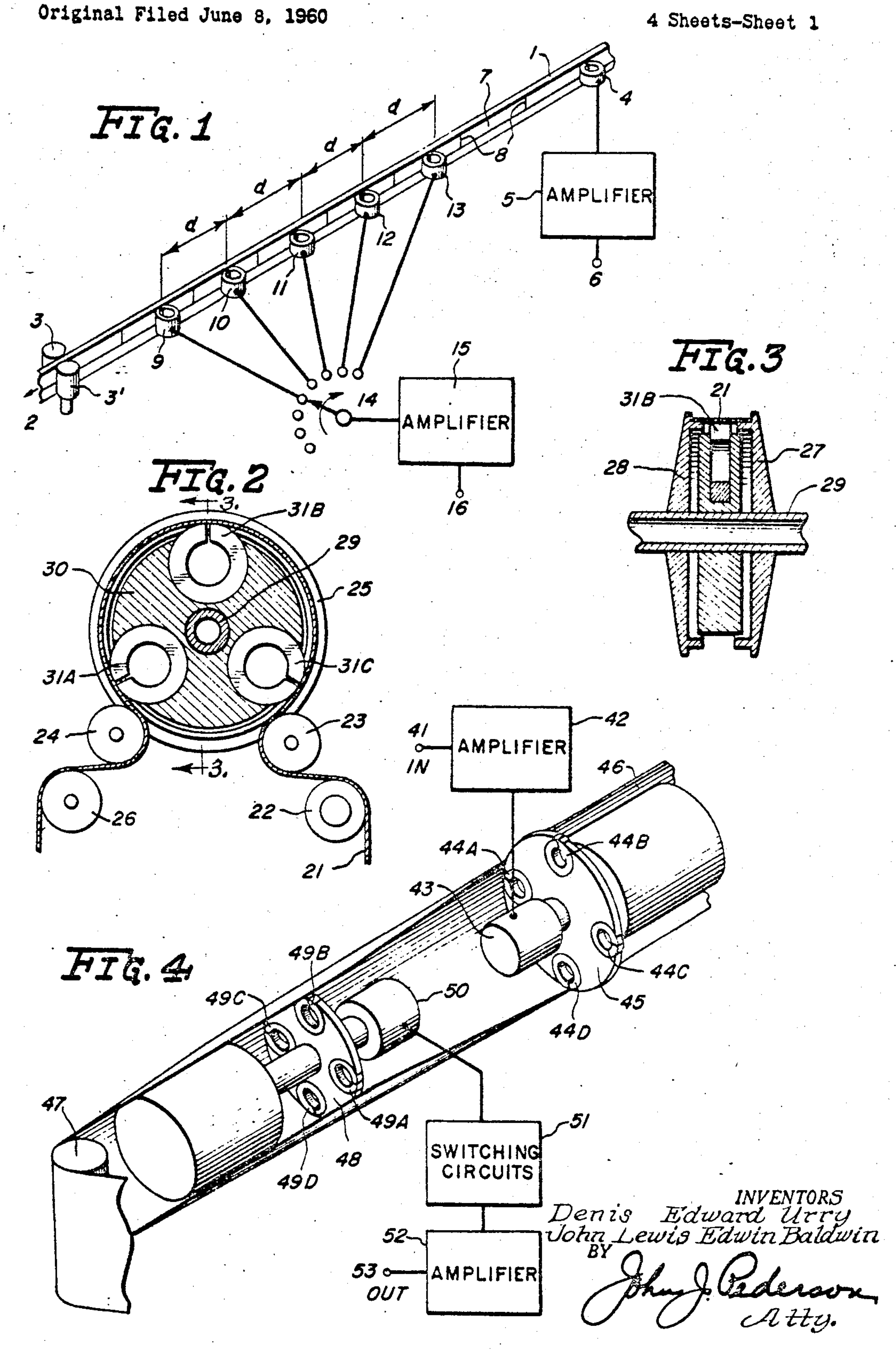
FIG. 1 is a schematic diagram illustrating the principle of one embodiment of the invention, in which a magnetic tape record is used to provide signal conversion from a signal having a greater number of lines to a signal having a lesser number of lines, both signals having the same frame repetition rate in each case.
FIG. 2 illustrates a portion of an alternative embodiment of the invention.
FIG. 3 is an axial cross-sectional view of a portion of the embodiment shown in FIG. 2.
FIG. 4 is a schematic diagram of a portion of an embodiment of the invention utilizing transverse recording on magnetic tape.

In FIG. 1, an elongated record member 1 is shown as being traversed in the direction indicated by arrow 2 by friction wheels 3, 3' driven by suitable conventional means, such as an electric motor (not shown). Record member 1 is thus drawn past a recording station at which a recording element 4, which is fed by an amplifier 5, records upon the record member television signals of which the scanning standard is to be converted. In the apparatus shown, the record element 4 is a magnetic recording head and record member 1 is a magnetic tape, but these elements may in principle be replaced by a modulated light source and a photographic film, though for economic reasons this probably would not be done. These signals are received at the input terminal 6 of amplifier 5 from any suitable source, such as a conventional television camera chain.

Recording element 4 produces on record member 1 a record of the television signals applied to it. This record is indicated in the drawing as comprising a strip 7 divided into successive television lines by transverse bars such as 8. This representation is purely diagrammatic; the record made on the record member will not necessarily be visible, and if visible will not have the form shown, which however suffices for purposes of explanation.

In accordance with this embodiment of the invention, it is desired to obtain from the record a television signal in which the number of lines contained in one frame is different from that in the recorded signal. To do this, signals are derived from the tape by an effectively infinite array of scanning elements, of which five are indicated at 9, 10, 11, 12 and 13, spaced apart by distances "*d*," each equal to the length of one scanning line. Each of these scanning elements is connected to one contact of a switch 14 by means of which each in turn of the elements may be connected to the input of an amplifier 15 which provides an output to terminal 16. The direction of movement of these scanning elements in relation to the tape is determined by the nature of the conversion which is to be effected. In the present case it will be assumed that the number of lines per frame of the reproduced signal is to be less than that in the recorded signal, so that it is necessary for some of the recorded lines to be omitted in reproduction. The array of scanning elements is therefore caused to move in the same direction as that in which the tape is moved, but at an appropriately different speed, such that if kept continuously in contact with the record member for a full frame period, each scanning element would traverse only the smaller number of scanning lines of the recorded signal required to complete a frame of the converted signal. Thus, where a signal containing $n_1$ lines per frame is to be converted to a signal containing $n_2$ lines per frame, the speed of movement of the array of scanning elements 9–13 must be $n_2/n_1$ times that of the record member.

If the signal were taken from a single one only of scanning elements 9–13 for a full frame period, the correct number of scanning lines would appear in the output signal, each occupying an appropriately extended period of time, but all these lines would be those scanned in succession in the original scanning operation, and the result would be that a complete section of the original signal containing the excess number of lines would be omitted in the reproduced signal. In accordance with the invention, this difficulty is avoided by taking the output signal from each in turn of the plurality of scanning elements 9–13 spaced apart by the length of one recorded scanning line.

The number of such scanning elements necessary may be calculated as follows: If a signal having lines, $n_1$, per frame is to be converted into a signal having a smaller number of lines, $n_2$, per frame, then during one frame period $n_1-n_2$ lines must be omitted. To omit a recorded line from the reproduced signal it is necessary to operate switch 14 so that the signal is taken from the scanning element immediately following that initially in use. To convert a signal from $n_1$ to $n_2$ lines per frame, it is necessary during each frame to change from one scanning element to another spaced from it along the tape by the length of one scanning line on $(n_1-n_2)$ occasions. In the apparatus shown in the schematic diagram of FIG. 1, this could only be done by employing an array of $F(n_1-n_2)$ scanning elements, where F is the number of frames in the whole signal to be converted. Such an arrangement is obviously impracticable, so the device is adopted of employing an effectively endless or infinite array of scanning elements. This may take the form of a drum around the periphery of which the record member is drawn and which contains within it and revolvable about its axis an array of scanning elements spaced along the record member carried round the drum by the length of one scanning line.

An arrangement of this kind is shown in FIGS. 2 and 3, of which FIG. 2 is an end elevation, with one part removed, of tape-recording and reproducing apparatus for carrying out the invention, and FIG. 3 is an axial section along the line 3—3 of FIG. 2. In these figures, a magnetic tape 21 is drawn past a recording head 22 and over guide rollers 23, 24 and a guide drum 25 by means of a capstan roller 26 driven at an appropriate speed by conventional means. As may be seen more clearly from the cross section given in FIG. 3, guide drum 25 consists of two flanged parts 27, 28 each rotating freely on a hollow shaft 29 to which is secured a scanning drum 30 which carries around its periphery three symmetrically disposed reading heads, indicated by references 31A, 31B, 31C, to which connections are made by way of hollow shaft 29. These heads project from the periphery of scanning drum 30 sufficiently to allow their reading gaps to touch the surface of tape 21 as it is supported by the flanges of drum 25, and the distances between their gaps along the tape are made equal to the length of one recorded line.

By this means an effectively continuous succession of equi-spaced reading heads is traversed by the tape carrying the recorded signals, so that by switching from one to the other of the reading heads a line may be omitted. It is, of course, necessary for the speeds of tape and scanning drum to be appropriately chosen for the conversion to be effected. In the case of conversion from 625 to 405 lines, for example, one line out of every $$625/(625-405)=2.841$$

of the recorded lines must be omitted. For this to be effected with the apparatus of FIGS. 2 and 3, the relative speeds of the tape around the guide drum 25 and of the scanning drum 30 must be such that 2.841 recorded lines pass a fixed point at the same time that each head on the scanning drum moves through a distance of 1.841 lines. Since the initial signal contains lines repetitive at 15,625 lines per second, the speed of drum 25 will be $$15{,}625/(3\times 2.841)=1456$$

revolutions per second. While not impossibly high, this speed imposes difficulties in the mechanical design of the bearings, which it is desirable to avoid. This may be done by increasing the number of equi-spaced heads contained in the drum, and in consequence its diameter; an increase in the number of heads to, say, 20 reduces the drum speed by a factor of ten without unduly increasing its diameter, though the complexity of the necessary switching circuits is obviously increased. It should be noted that even though the number of heads in the drum is increased, only one of these is operative at any time, and that will be that head which lies within a predetermined sector of the drum, selected by the timing of the switching processes.

The method of recording television signals as on or more longitudinal tracks on an elongated record member has, however, been found to be inconvenient in practice, owing to the high linear speed of the record member and the consequent bulk of the member when signals are to be recorded for any considerable period of time. Attention is therefore concentrated on methods of recording in which signals are recorded as traces lying transversely across the elongated record member. Once again, such a system may employ either magnetic, photographic or electrographic recording, but only the first of these will be specifically described in relation to FIG. 4 of the drawings.

FIG. 4 illustrates apparatus using a magnetic recording having traces transverse to the width of the tape for the purpose of converting a television signal from 625 to 405 lines. In this case a television signal developed by any conventional source is received at an input terminal 41 and is fed to an amplifier 42, from which the amplified output signal is taken by way of slip ring 43 to four recording heads 44A, 44B, 44C, 44D mounted at equal intervals around the periphery of a rotating drum 45. In a manner well known in the art, there may be interposed between amplifier 42 and each of heads 44A–44D an individual drive amplifier of which the gains may be adjusted to obtain equal recording amplitudes. Against drum 45 there is pressed by conventional guide means (not shown) a magnetic recording tape 46 which is arranged to be drawn past the recording drum by an appropriate capstan mechanism, indicated at 47.

The apparatus as so far described is conventional. In accordance with an embodiment of the invention, however, the size of recording drum 45 is so chosen in relation to its rate of rotation that the separation of successive recording heads corresponds to the length occupied by 2.841 recorded scanning lines. Thus the record made on tape 46 consists of a succession of traces each containing, in addition to any portion of the signal unique to that trace, initial and terminal portions common to the adjacent traces.

To convert the 625-line recorded signal into a 405-line signal in accordance with the present invention, the record tape is now read by a reading drum 48 which is of such diameter that the four reading heads 49A–49D which it carries are spaced apart by one line less than the distance between the recording heads, of 1.841 lines. To obtain this dimension the diameter of reading drum 48 may be 1.841/2.841 times that of the recording drum, if the same number of heads are employed.

There is no necessity for the recording and reading drums to carry the same number of heads, provided that their speeds are appropriate to the number of heads carried. The essential requirement is that one and only one reading head traverses each trace recorded on the tape. In this case the lines of each frame of the recorded signal are divided among 220 traces, each of which is scanned by one recording and one reproducing head, so that as the frame speeds are the same for both standards, the speed of rotation of the drum must be $220/4\times25=1375$ revolutions per second. This speed may be reduced by increasing the number of heads contained in each drum, care being taken to keep the drum diameter as small as possible to avoid excessive stress due to centrifugal force.

The signals derived from heads 49A–49D are fed out by way of a slip ring assembly 50 containing a separate contact for each head to a switch system 51 by which the signal derived by each in turn of the heads is fed to an output amplifier 52 and then to an output terminal 53. The operation of this switching arrangement is such that the output signal is taken from each in turn of heads 49A–49D, the change-over from each to the next being effected whenever the next head in moving down its trace encounters the line-blanking interval. The effect of this is that although each head always reproduces an integral number of lines in scanning a trace, this number is not always the same, but is either two or one, so that the average number of lines scanned during each field period is the required 1.841, and the actual number of lines scanned during one frame period is 405. The result of the whole operation is thus to reproduce a signal having 405 lines per frame instead of the original 625.

In apparatus according to the invention in which the signals are recorded as transverse traces upon a record carrier and read off by a scanning element moving differently from that used for recording, the paths of recording and reproducing elements across the record member are advantageously made to coincide as exactly as possible. This may be done in the apparatus described above by arranging the scanning drum carrying the reading heads so that it rotates upon an axis which is appropriately tilted to the direction of tape travel. If this is inconvenient, the difficulties otherwise resulting may be alleviated by employing a recording drum yielding traces wider than the track of the scanning heads on the reading drum. The former method, however, is preferred.

To convert between other numbers of lines the same apparatus may be used, with the obvious modification that the number of traces in which each frame is recorded and the number of lines recorded per trace will be appropriately varied. Thus, to convert from 625 to 525 lines, 50 traces are recorded for each field, or 100 per frame, each trace containing 6.25 lines, while to convert a 525-line signal to one of 405 lines, each frame is recorded as 120 traces each containing 4.375 lines.

To increase the number of lines per frame, exactly the same principle is employed, but the traces each contain the lower number of lines obtained by subtracting one from those given above. Thus, to convert from 405 to 525 lines, 120 traces per frame are recorded, by heads spaced apart by 3.375 lines, and these are reproduced by heads spaced to develop 4.375 lines per trace, so that one additional line is reproduced from the repeated information contained in each trace at each transition from one reproducing head to the next. The same principle applies to conversion from 525 to 625 lines, or to 819 lines.

In converting between standards with widely different numbers of scanning lines, such as from 819 to 405 lines, or vice versa, the head spacing of the drum operative at the lower number of lines may be adjusted to span two lines less than the head spacing for the higher number of lines.

In the embodiments of apparatus according to the invention which have so far been described, it has been possible to change the number of lines contained in each frame, but not to change the frame repetition rate. It would in principle be possible to modify the apparatus shown in FIG. 4 by providing means for changing the speed of traverse of the record member past the reading drum during certain field flyback intervals, so as to repeat a complete frame in the reproduced signal, or to elide a complete frame from it, according to the requirements of the conversion being effected. Practical limitations of mechanical design prevent this process being usefully carried out without undue expense, and so the present invention contemplates the use for the purpose of changing the frame repetition rate when necessary of two separate but identical records. If two such records of the signal to be converted from one frame repetition rate to another are made and are scanned as already described in accordance with the invention to derive signals having different numbers of lines per frame than those in the recorded signal, then in accordance with an extension of the invention, signals may be taken from each of these records in turn, and during the intervals in which it is not being used to provide signals, each record member may be accelerated or decelerated, so that when it is again used to provide the output signals, a field or frame will have been elided or will be repeated, thus decreasing or increasing the number of frames per second, as required.

Figure 5:
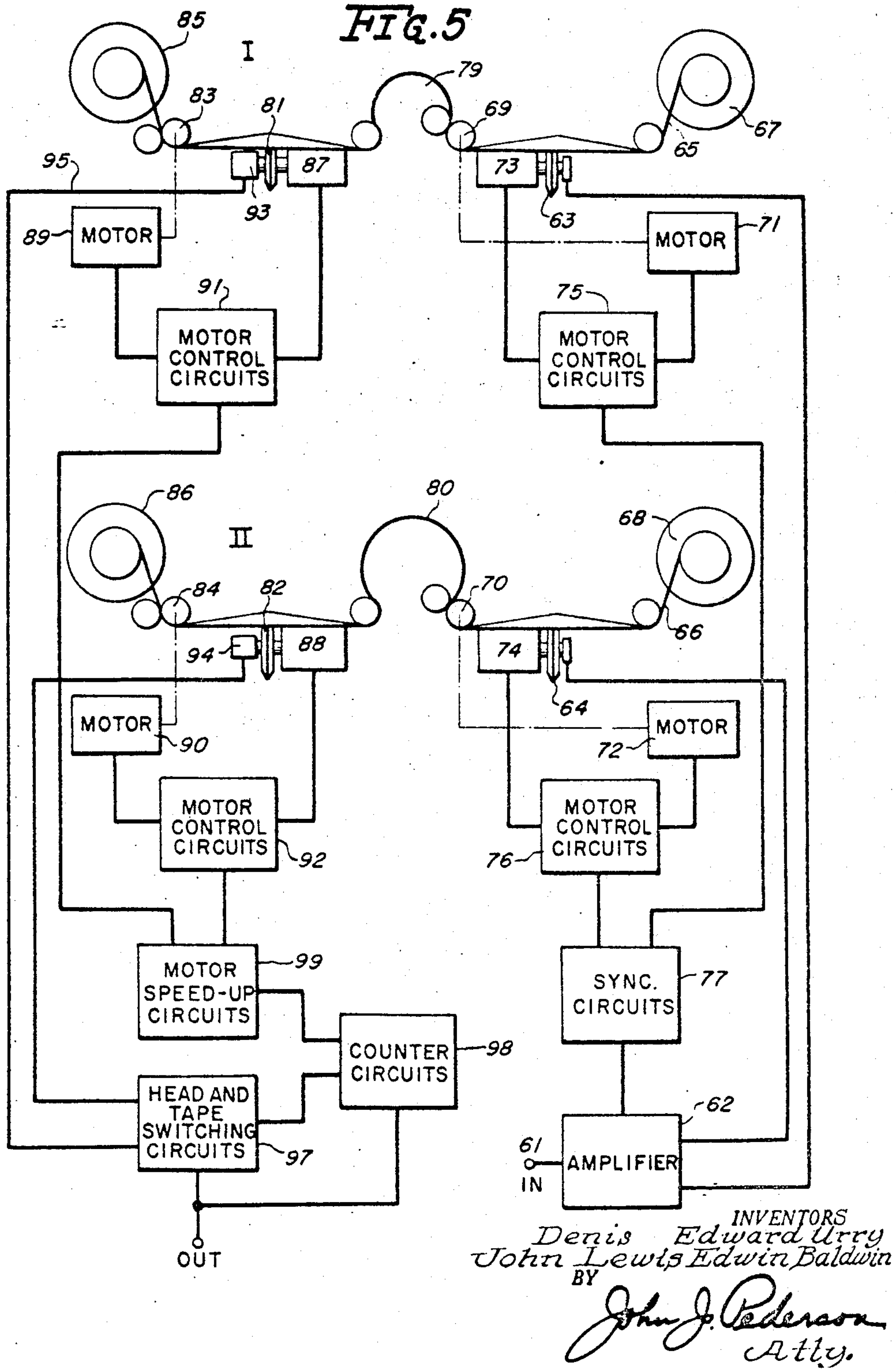
FIGS. 5, 6, 7 and 8 are schematic diagrams of other embodiments of the invention.

One possible embodiment of apparatus of this type is illustrated schematically in FIG. 5, where there are shown two complete recording and reproducing channels each of the general type described in relation to FIG. 4. The apparatus will be described as suitable for the conversion of 525-line 60-fields-per-second television signals to 405-line 50-fields-per-second signals, but the invention is in no way limited to this one conversion, as has already been explained.

Since each frame of the reproduced signal is to contain 405 lines, as compared with 525 lines in each frame of the recorded signal, a total of 120 lines is to be elided from each recorded frame. The signal is therefore recorded in each of two record members by recording heads spaced apart and moving at a speed such as to record $525/120=4.375$ lines in each of 120 traces per frame, and is recovered from these record members by reading heads spaced apart and moving at a speed such as to recover only $4.375-1=3.75$ lines per trace. In addition, it is arranged that at intervals of five frames in the reproduced picture, a frame is elided, so that every six recorded frames yield only five reproduced frames, so that the frame rate of the reproduced signal is the necessary 25 frames per second.

In the apparatus illustrated in FIG. 5, 525-line television signals received at terminal 61 from any conventional source are applied to a twin drive amplifier 62 from which output signals at appropriate impedance are fed to energize the recording heads contained in the recording drums 63, 64. Although a single connection to the recording heads is shown, this arrangement may advantageously be modified by employing separate drive amplifiers of adjustable gain for each recording head, in a manner well known in the art. It is only necessary to use whatever means are found convenient to insure that any difference in the amplitudes of the signal traces recorded by the different heads shall be insufficient to have any deleterious effect upon the operation of the system.

Past each of the recording drums 63, 64 magnetic tapes 65, 66 are drawn from feed spools 67, 68 by capstans 69, 70 driven by motors 71, 72. The recording drums 63, 64 are driven by motors 73, 74 which, together with feed motors 71, 72, are controlled by known circuits contained in control units 75, 76 to have appropriate relative speeds. To insure the correct speeds for the motors, each control unit 75, 76 is fed with synchronizing signals derived from the input signals by a synchronizing-signal separator unit 77 fed with the input signal from drive amplifier 62.

The whole of the apparatus as thus far described operates in known manner to record on tapes 65, 66 identical records of the incoming signal, each record containing 120 traces per frame, made by heads spaced 4.375 lines apart and repetitive at 60 frames per second. As has already been indicated, the number of heads carried on the drums may be increased to reduce the rate of revolution which is necessary.

The tapes 65, 66, carrying identical recorded signals, are lead into loops 79, 80 and then past reading drums 81, 82 to capstans 83, 84, whence they pass to take-up spools 85, 86. Reading drums 81, 82 are driven by motors 87, 88 and capstans 83, 84 by motors 89, 90. These motors are controlled by motor control units 91, 92 which contain circuits appropriate to the control functions hereinafter to be described.

The spacing of the heads on the reading drums 81, 82 is that corresponding to the length of 3,375 recorded lines, while the tape speed past the reading drum during read-out is such that 3000 traces pass the drum every second, instead of the 3600 which are recorded in that time. If this process were continued with a single record member, the loop between recording and reading drums would continuously increase in size, since the read-out rate is less than that of recording. The result of this would be to extend the time scale of the recorded signals, which is obviously undesirable. To avoid this, signals are read from each in turn of tapes 65, 66, and the tape which at any time is not being used for reproduction of the signal is accelerated so that during the period in which it is inoperative, two frames more of the recorded signals are fed past the reading drum than pass the reading drum of the operative tape. In the present instance, five frames are to be elided for every 50 frames which are reproduced, so that while five recorded frames are being reproduced by one reading drum, seven frames are being drawn past the other.

It is necessary for seven frames to be drawn past the inoperative head while only five are scanned by the operative head, because the average speed of each tape must be twelve frames in every complete cycle of alternation.

To effect the necessary switching from one reproducing channel to the other, the outputs from reading heads 85, 86 are fed to a switching unit 97, which contains circuits arranged to select the output from each head in turn of each channel and also for selecting the output from one channel or the other in alternation. The change-over from one channel to the other may be controlled by a counter circuit 98, fed with the output signal from switch unit 97 and arranged to effect a change-over from one channel to the other every time five frames have been reproduced. This counter circuit also controls a motor control unit 99, which is arranged appropriately to increase the speed of the tape traverse motor of the inoperative channel and to reduce the speed again so as restore synchronism before the inoperative channel is again taken into use. For this purpose counter unit 98 may also contain a counter circuit fed with the output signals from the channel in which the tape is accelerated and arranged to respond to frame-synchronizing pulses, to control the rapid movement of the tape necessary to move it through two additional frames.

Figure 6:
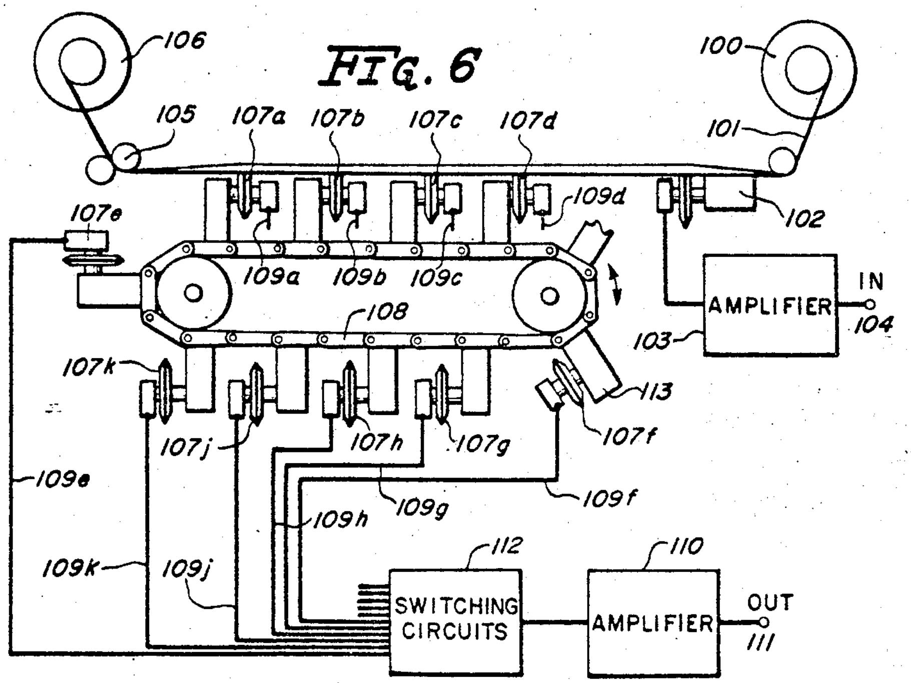

In an alternative embodiment of the invention, which is illustrated in FIG. 6, a record tape 101 has signal traces each containing 4.375 lines of the 525-line signal recorded upon it by a recording drum 102, fed with amplified television signals from a feed amplifier 103 to which signals to be recorded are applied at an input terminal 104.

From a feed spool 100 tape 101 is traversed past drum 102 at an appropriate speed by a capstan 105 from which the tape passes to a take-up spool 106. In passing from drum 102 to capstan 105, tape 101 passes over a succession of reading drums **107*a*, 107*b*, 107*c*, 107*d*, forming part of an endless succession of such drums carried on a conveyor system 108 by which they may be moved in the direction of the tape travel at a speed such that each frame is traversed in 1/25 second, instead of the 1/30 second which was taken in recording it. The rotary speed of the recording drum and the spacing of the heads upon it are again so chosen that on the average 3.375 lines are read off from each trace, instead of the 4.375 lines recorded. When five recorded frames have been read off the tape by any drum, the output amplifier 110 feeding output terminal 111 to which the drum is connected by the appropriate one of cables 109*a*–109*l* and a switch unit 112 which contains arrangements for selecting the signal from the appropriate one of the reading heads carried on the operative reading drum and also the signals from the appropriate reading drum, receives the signal from the next head behind it in succession. The heads are spaced along the tape by distances equal to the length occupied by one recorded field, so that when the output is switched from one head to the next, one field is elided from the reproduced signal. It will be desirable to arrange an appropriate mechanical servo-mechanism to adjust the positions of the reading drums along the tape so as to track exactly with the signal traces recorded upon the tape. It is thought that the modifications of known tracking systems in which the tape speed is varied are sufficiently obvious to those skilled in the art not to need detailed discussion here. Briefly, the system employed is arranged to displace the reading drum longitudinally in relation to the conveyor so that the maximum output signal is derived from the reading heads, thus assuring that each reading head scans along the appropriate trace on tape 101**.

In the figure no specific means are shown for driving the reading drums, each being shown as carried on a shaft from one of a number of devices 113 which may be assumed to contain the necessary drum-drive motor. It would in practice be mechanically difficult to devise appropriate small mechanism within the small distance determined by the one-field separation of heads along the tape, unless a very uneconomic use is made of the tape by recording successive traces much farther apart than is necessary. This system, though correct in principle, is therefore unlikely to be employed in practice.

Figure 7:
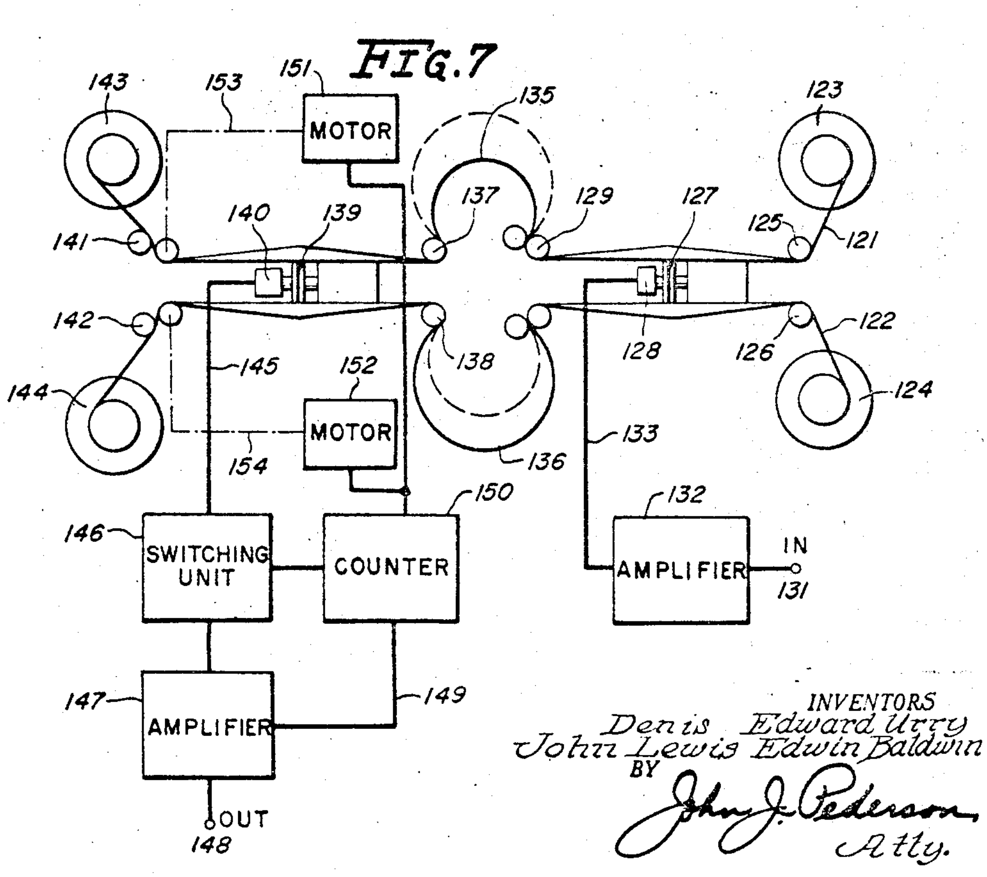

In FIG. 7, two tapes 121, 122 are drawn from feed spools 123, 124 over guide rollers 125, 126 and past a recording drum 127, to which signals are led by way of a slip-ring-and-brush assembly 128, by means of identically driven capstans 129, 130. The signals to be recorded, which are received at an input terminal 131 from any conventional source, are amplified in a drive amplifier 132 and then fed to the recording heads contained in drum 127 by way of slip-ring assembly 128. It may be advantageous to include within amplifier 132 separate drive amplifiers of adjustable gain for each head, in which case connection 133 by which the amplified signals are conveyed to slip-ring assembly 128 will be a cable, and separate slip-ring connections will be provided for each head.

After leaving capstans 129, 130, tapes 121, 122 are led in loops 135, 136 and over further guide rollers 137, 138 and past a reading drum 139, to which connection is made by way of a slip-ring-and-brush assembly 140, to capstans 141, 142, whence they pass to take-up spools 143, 144.

The connections to the heads contained in reading drum 139 are taken from slip-ring assembly 140 by way of cable 145 to a switching device 146 by means of which the output from any one of the reading heads may be selected for application to an output amplifier 147, from which the reproduced and converted signal is fed to an output terminal 148. Part of the output signal is also fed through a connection 149 to a counter unit 150, which is arranged to respond to the frame-synchronizing signals contained in the output signal and to change the switching sequence performed in switching device 146 after every five frame-synchronizing signals reproduced in the signal derived from either tape so that the signals are then taken from the other tape for the succeeding five frames. The counter unit also contains circuits which operate at the same intervals as the signal change-over described above and which are arranged to control motors 151, 152 which drive capstans 141, 142 by way of suitable drive mechanisms, indicated only as chain lines 153, 154, so that during the interval in which a signal is not being taken from the tape which it controls, each capstan accelerates so as to draw seven frame lengths of its tape past reading head 139 instead of the five frames which are drawn past on the other tape.

In this arrangement, as in the embodiments previously described, the television signals to be converted are recorded on the tape in traces each containing 4.375 lines and are read off the tape by heads spaced to read an average of only 3.375 lines from each trace. As before, the head-sequence switching necessary to effect this conversion is simple, requiring only that the head next to yield a signal shall commence to do so during the first line-blanking interval which it encounters on its trace.

Figure 8:
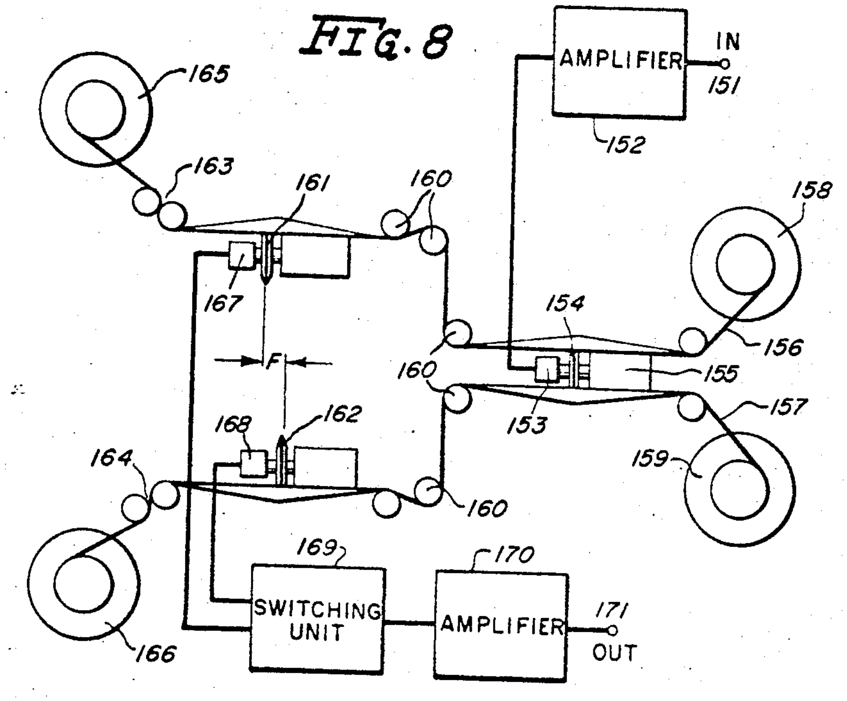

FIG. 8 is an alternative embodiment of the invention which may sometimes be employed with the advantage that two records are made and these are scanned by separate reading drums which operate alternately and move through one frame length in one direction along the tape while reading and in the opposite direction when inoperative. Such a system is one in which signals to be recorded are received at an input terminal 151a and applied to a drive amplifier 152a which feeds signals by way of a slip-ring assembly 153a to recording heads on a recording drum 154a driven by a motor 155. Past and in contact with drum 154a, two magnetic tapes 156, 157 are drawn from feed spools 158, 159. When the system is in operation these tapes thus receive identical records.

After leaving drum 154a, tapes 156, 157 pass over guide rollers 160 and over reading drums 161, 162 to capstans 163, 164 and then to take-up spools 165, 166. Signals derived by the heads on drums 161, 162 are taken by way of slip-ring-and-brush assemblies 167, 168 to a switching unit 169, which selects the signals from each head in turn and from each drum in turn at appropriate intervals for transmission to an output amplifier 170 and then to output terminal 171. Drums 161, 162 are arranged to be movable parallel to the direction of tape travel over a useful distance F equal to the length along the tape of one recorded frame. That drum which at any time is called on to provide the output signal is moved through this distance at a constant speed, either with or against the direction of tape movement, according to whether the number of frames in the output signal is to be less or more than that in the recorded signal. While one drum is thus moving at constant speed in one direction, the other drum, which has just completed such a movement, is returned smoothly past its starting point and accelerated again to its correct velocity in time to be taken into use.

Figure 9:
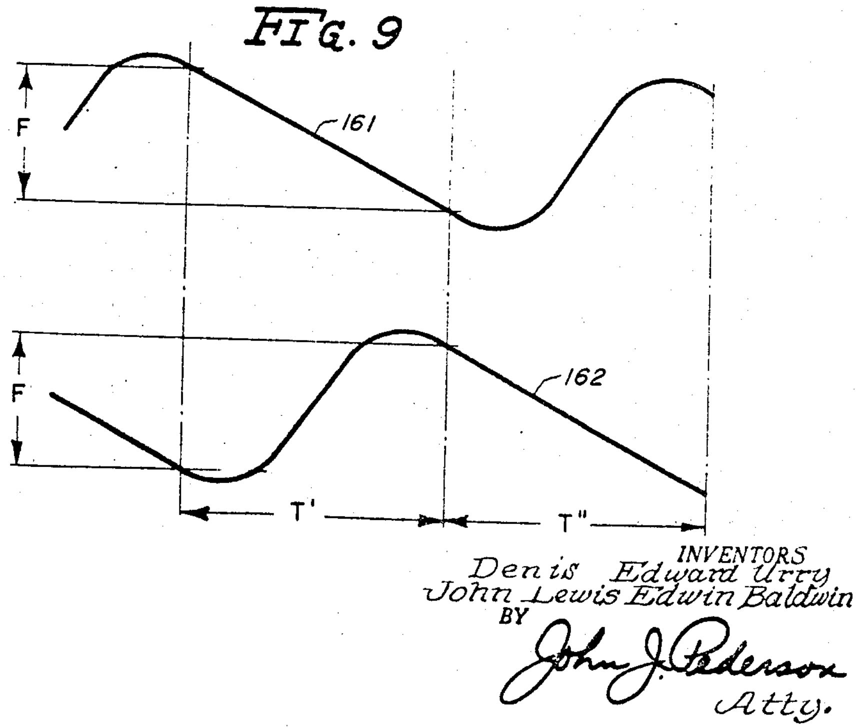
FIG. 9 shows two time-motion graphs illustrating the motions of portions of the embodiment of FIG. 8.

This action is illustrated by the time-motion diagram of FIG. 9, which shows by curves 161, 162 the motions of the correspondingly numbered reading drums of FIG. 8. The profiles of these curves may be regarded as being the developments of the surfaces of cams suitable of producing the required movements of the drums. Such cams may be arranged to be rotated at a suitable constant velocity and to control through appropriate linkages the movements of carriages bearing drums 161, 162 together with their driving motors and slip-ring assemblies. It will be seen that during period T′, drum 161 is moving at a uniform velocity in one direction, while drum 162 is being smoothly decelerated, returned to the other extreme of its travel and accelerated to the uniform velocity it will have during the successive period T″, when drum 161 will be returned to its starting point.

The various embodiments have provided several methods of converting the given scanning line and frame frequency rate of a first television signal train to a different scanning line and frame frequency rate forming a second television signal train. Magnetic recording techniques employing single and dual tape transport apparatus used in conjunction with both movable and stationary reading and recording heads provide various methods for eliding or repeating lines and frames when translating television signals from one standard to another.

While particular embodiments of the present invention have been shown and described, it is apparent that changes and modifications may be made therein without departing from the invention in its broader aspects. The aim of the appended claims, therefore, is to cover all such changes and modifications as fall within the true spirit and scope of the invention.

What is claimed is:

1. Apparatus for the conversion of a first television signal having an assigned number of lines per frame to a second television signal having a higher number of lines per frame, said apparatus comprising: a record member, a recording position, a recording element at the recording position for producing upon said member a physical record of said first television signal, a reproducing position; drive means for traversing said record member past said recording and reproducing positions at the same speed; a plurality of scanning elements at said reproducing position mounted to engage said record member in succession to derive signals therefrom, said elements being effectively spaced apart by the length of a single recorded scanning line; means for moving said scanning elements in relation to said record member at a speed such that each said element traverses a record of one scanning line in a time equal to the duration of one line in said second television signal; switching means for deriving an output signal from each of said scanning elements in succession; and means for repeatedly operating said switching means to transfer said output signal from one of said scanning elements to another scanning element engaging a portion of said record which has already been reproduced in said output signal, whereby at each said transfer a line of said first signal appears twice in said output signal, the number of said transfers effected during the reproduction of each frame being equal to the difference between said assigned number and said higher number.

2. Apparatus for the conversion of a first television signal having an assigned number of lines per frame to a second television signal having a lower number of lines per frame, said apparatus comprising: a record member, a recording element at a recording position for producing upon said member a physical record of said first television signal, a reproducing position; drive means for traversing said record member past said recording and reproducing positions at the same speed; a plurality of scanning elements at said reproducing position mounted to engage said record member in succession to derive signals therefrom, said elements being effectively spaced apart by the length of a single recorded scanning line; means for moving said scanning elements in relation to said record member at a speed such that each said element traverses a record of one scanning line in a time equal to the duration of one line in said second television signal; switching means for deriving an output signal from each of said scanning elements in succession; and means for repeatedly operating said switching means to transfer said output signal from one of said scanning elements to another scanning element engaging a portion of said record which has not previously been reproduced in said output signal, whereby at each said transfer a line of said first signal is omitted from said output signal, the number of said transfers effected during the reproduction of each frame being equal to the difference between said assigned number and said lower number.

3. Apparatus for the conversion of a first television signal having an assigned number of lines per frame to a second television signal having a different number of lines per frame, said apparatus comprising: a record member; a recording assembly including a plurality of recording elements for producing upon said member a physical record of a television signal to be converted, said recording elements being mounted to engage said record member in succession; recording drive means causing said elements to traverse said record member at a constant speed, said elements being spaced at a common separation corresponding to a given non-integral number of lines in said first signal, said given non-integral number being equal to the number of lines per frame in said first signal divided by the difference between said given number and said different number; a reproducing assembly comprising a plurality of reproducing elements for reproducing a television signal from said record, said reproducing elements being mounted to engage said record member in succession; reproducing drive means causing said reproducing elements to traverse said recorded signal at a speed such that each said reproducing element traverses a recorded line in a time equal to the duration of one line in said second television signal, said elements being spaced at a common separation corresponding to a second non-integral number of lines differing by unity from said given non-integral number and larger or smaller than said number according as said given number of lines per frame is less than or greater than said different number; and switching means operating at intervals corresponding to the integral number of lines of said second television signal next less than said second non-integral number to derive an output signal from each in succession of said reproducing elements.

4. Apparatus for the conversion of a first television signal having a specified number of frames per second and a given number of lines per frame into a second television signal having a different number of frames per second and another number of lines per frame, said apparatus comprising: a pair of magnetic tapes; first and second recording assemblies each comprising the same plurality of magnetic recording heads mounted to engage an assigned one of said tapes in succession, the heads of each said assembly being spaced to engage said tape at a common separation corresponding to a given non-integral number of lines in said first signal, said given non-integral number being equal to the number of lines per frame in said first television signal divided by the difference between said given number and said other number; first tape drive means for transporting said tapes past said assemblies at a predetermined common speed; first and second read-out assemblies, each said read-out assembly comprising a plurality of magnetic read-out heads individually engaging an assigned one of said tapes in succession, the heads of each said read-out assembly being spaced to engage the assigned one of said tapes at a common separation corresponding to a non-integral number of lines differing by unity from said given non-integral number and larger or smaller than that number according as said given number of lines per frame is greater or less than said other number; read-out drive means causing the heads of each said assembly to traverse the assigned one of said tapes at a speed such that each said read-out head traverses a record of one line in a time equal to the duration of one line in said second television signal; read-out tape drive means causing each of said tapes to be traversed past the assigned one of said reproducing assemblies alternately at a first speed such that said different number of frames per second passes said reproducing assembly and at a second speed such that the mean number of frames passing said assembly in one second is said specified number, said tapes being traversed at said first and second speed in alternate succession; and switch means operating to derive an output signal from that one of the read-out heads of that assembly past which one of said tapes is being traversed at said first speed which is reproducing a signal from said tape.

5. Apparatus for the conversion of a first television signal having a specified number of frames per second and a given number of lines per frame into a second television signal having a different number of frames per second and another number of lines per frame, said apparatus comprising: a record member; a recording assembly comprising a plurality of recording elements mounted to engage said record member in endless succession to record said first television signal thereon; recording drive means causing said elements to traverse said record member at a constant speed; said elements having a common separation such that each said element records the same number of lines of said first signal on said record member; a plurality of assemblies mounted to engage said record member in succession at a common separation corresponding to one frame of said recorded signal; means for traversing said assemblies in said succession in relation to said record member at a speed such that each said assembly traverses the record of one frame of said recorded signal in a time equal to the duration of one frame in said second television signal; each said assembly comprising a like plurality of reproducing elements mounted to engage said record member in succession; each said reproducing assembly also comprising reproducing drive means causing said reproducing elements of that assembly to traverse said record member at a speed such hat each said element traverses one recorded line in a time equal to the duration of one line in said second television signal; said reproducing elements being spaced to engage said record member at a common separation corresponding to a number of lines differing by unity from said same number and larger or smaller than said number according as said given number of lines is greater or less than said other number, each said reproducing assembly comprising also switching means operating at intervals corresponding to an integral number of lines of said second television signal to derive an output signal from each in succession of said reproducing elements in said assembly; further switching means operating to derive an output signal from each in succession of said assemblies; and means repeatedly operating to cause said switching means to transfer said output from one said assembly to another next in succession thereto, the direction of said transfer being such that when said specified number exceeds said different number said output signal is taken from an assembly engaging a portion of said record which has not previously been reproduced and when said specified number is less than said different number said output signal is taken from an assembly engaging a portion of said record which has already been reproduced in said output signal, the number of said transfers occurring during one second period of time being equal to the difference between said specified and different numbers.

6. Apparatus for the conversion of a first television signal having a specified number of frames per second to a second television signal having a different number of frames per second, said apparatus comprising: first and second magnetic tapes; a recording assembly comprising a plurality of magnetic recording heads mounted to engage each of said tapes in succession to record said first television signal thereon; recording drive means traversing each said recording head over said tapes at a constant speed; recording tape drive means traversing both said tapes past said assembly at the same constant speed; a reproducing assembly comprising a plurality of magnetic read-out heads mounted to engage each of said tapes in succession; reproducing drive means traversing said read-out heads over said tapes at a constant speed; reproducing tape drive means traversing said tapes past said reproducing assembly in opposite alternation at a first speed such that said different number of frames of said recorded signal pass said assembly in one unit of time and at a second speed such that the average over a period of the number of frames passing said assembly in said unit of time is said specified number; and switch means operating to derive an output signal from those of said read-out heads which at any time are engaged with that one of said tapes which is moving at said first speed.

7. Apparatus for the conversion of a first television signal having a specified number of lines per frame to a second television signal having a different number of lines per frame, said apparatus comprising: first and second magnetic tapes; a recording assembly comprising a plurality of magnetic recording heads mounted to engage each of said tapes in succession to record said first television signal thereon; recording drive means traversing each said recording head over said tapes at a constant speed; recording tape drive means traversing each of said tapes past said assembly at the same constant speed; individual reproducing positions for each said tape; a reproducing assembly at each said reproducing position, each said assembly comprising a like plurality of magnetic reproducing heads mounted to engage the assigned one of said tapes in succession; reproducing-head drive means causing the heads of each said assembly to traverse said tape at the same constant speed, reproducing-tape drive means traversing each said tape past its assigned reproducing positions at the same constant speed, and reproducing-assembly traversal means causing each of said reproducing assemblies to traverse its assigned tape alternately in the direction of tape traversal and in the opposite direction over a distance equal to the space occupied by one recorded frame of said first television signal, said assemblies moving always in opposite directions, the speed of traversal of each said assembly being such that said assembly traverses said distance in a time equal to the duration of one frame in said second television signal when moving in one direction and switching means for deriving an output signal from that one of said assemblies which is moving in said one direction.

No references cited.

DAVID G. REDINBAUGH, *Primary Examiner.*

H. W. BRITTON, *Assistant Examiner.*